(12) United States Patent
Cailleteau et al.

(10) Patent No.: US 12,208,902 B2
(45) Date of Patent: Jan. 28, 2025

(54) SEAT UNIT PROVIDED WITH A TUBULAR SEAT-BASE STRUCTURE

(71) Applicant: Safran Seats, Plaisir (FR)

(72) Inventors: Jeremy Cailleteau, Moissy-Cramayel (FR); Olivier Cazalis, Moissy-Cramayel (FR); Laurent Ligonniere, Moissy-Cramayel (FR)

(73) Assignee: Safran Seats, Plaisir (FR)

( * ) Notice: Subject to any disclaimer, the term of this patent is extended or adjusted under 35 U.S.C. 154(b) by 141 days.

(21) Appl. No.: 18/015,523

(22) PCT Filed: Jul. 7, 2021

(86) PCT No.: PCT/EP2021/068885
§ 371 (c)(1),
(2) Date: Jan. 10, 2023

(87) PCT Pub. No.: WO2022/013039
PCT Pub. Date: Jan. 20, 2022

(65) Prior Publication Data
US 2023/0257124 A1 Aug. 17, 2023

(30) Foreign Application Priority Data
Jul. 16, 2020 (FR) .................................. 2007447

(51) Int. Cl.
*B60N 2/12* (2006.01)
*B64D 11/06* (2006.01)

(52) U.S. Cl.
CPC ............ *B64D 11/0648* (2014.12); *B60N 2/12* (2013.01); *B64D 11/0641* (2014.12); *B64D 11/0696* (2013.01)

(58) Field of Classification Search
CPC .... B60N 2/12; B64D 11/0641; B64D 11/0648
(Continued)

(56) References Cited

U.S. PATENT DOCUMENTS

| 3,037,812 | A |   | 6/1962 | Monroe |          |
|-----------|---|---|--------|--------|----------|
| 7,533,930 | B1| * | 5/2009 | Fissette | ............ B60N 2/01 |
|           |   |   |        |        | 297/118 X |

(Continued)

FOREIGN PATENT DOCUMENTS

| EP | 3348480 A1 |   | 7/2018 |          |
|----|------------|---|--------|----------|
| EP | 3715255 A1 | * | 9/2020 | ....... B64D 11/06395 |

(Continued)

OTHER PUBLICATIONS

International Patent Application No. PCT/EP2021/068885, English Translation of the Written Opinion of the International Searching Authority, dated Dec. 2, 2022.

(Continued)

*Primary Examiner* — Rodney B White
(74) *Attorney, Agent, or Firm* — Kilpatrick Townsend & Stockton LLP

(57) ABSTRACT

A seat unit, in particular for an aircraft cabin, includes a seat provided with seat cushion and backrest kinematics, and a seat-base structure on which the seat is mounted. The seat-base structure includes a frame with a tubular structure including a first lower tube and a second lower tube, the first lower tube and the second lower tube each carrying at least one bolt intended to be fastened to rails, and two fastening feet for fastening the seat cushion and backrest kinematics. A fastening foot is formed by a tube connected by one of its ends to the first lower tube of the frame and by its other end to the second lower tube of the frame.

14 Claims, 10 Drawing Sheets

(58) Field of Classification Search
USPC .......................................... 297/118, 341, 342
See application file for complete search history.

(56) References Cited

U.S. PATENT DOCUMENTS

| | | | | |
|---|---|---|---|---|
| 7,997,654 B2* | 8/2011 | Ferry | ................. | B64D 11/0626 |
| | | | | 297/342 X |
| 8,579,375 B2* | 11/2013 | Marais | ................. | B60N 2/02 |
| | | | | 297/341 |
| 8,931,834 B2* | 1/2015 | Wallace | ............. | B64D 11/0646 |
| | | | | 244/118.6 |
| 10,450,070 B2* | 10/2019 | Beroth | ................. | B60N 2/2222 |
| 10,450,072 B2* | 10/2019 | De La Garza | ..... | B64D 11/0648 |
| 10,683,094 B2* | 6/2020 | Braca | ................. | B64D 11/0601 |
| 10,870,489 B2* | 12/2020 | Dowty | ................. | B60N 2/77 |
| 10,988,055 B2* | 4/2021 | Glain | ................. | B64D 11/0606 |
| 11,565,819 B2* | 1/2023 | Mayne | ................. | B64D 11/064 |
| 2014/0210235 A1* | 7/2014 | Ferry | ................. | B60N 2/20 |
| | | | | 244/118.6 |
| 2017/0015423 A1* | 1/2017 | Udriste | ................. | B60N 2/77 |
| 2018/0215469 A1 | 8/2018 | Uriu et al. | | |
| 2018/0281960 A1* | 10/2018 | Weingart | ............. | B64D 11/062 |
| 2022/0396359 A1 | 12/2022 | Bonnefoy et al. | | |

FOREIGN PATENT DOCUMENTS

| | | | | |
|---|---|---|---|---|
| EP | 4249377 A1 * | 9/2023 | ........... | B64D 11/064 |
| FR | 1912243 A1 | 5/2021 | | |
| GB | 547453 A | 8/1942 | | |
| WO | WO-2018184660 A1 * | 10/2018 | ........... | B60N 2/0232 |
| WO | 2020091820 A1 | 5/2020 | | |
| WO | WO-2023227847 A1 * | 11/2023 | ......... | B64D 11/0641 |

OTHER PUBLICATIONS

International Patent Application No. PCT/EP2021/068885, International Preliminary Report on Patentability Chapter I, dated Jan. 17, 2023.

International Patent Application No. PCT/EP2021/068885, International Search Report (and translation) and Written Opinion, mailed Sep. 24, 2021.

* cited by examiner

[Fig 1]
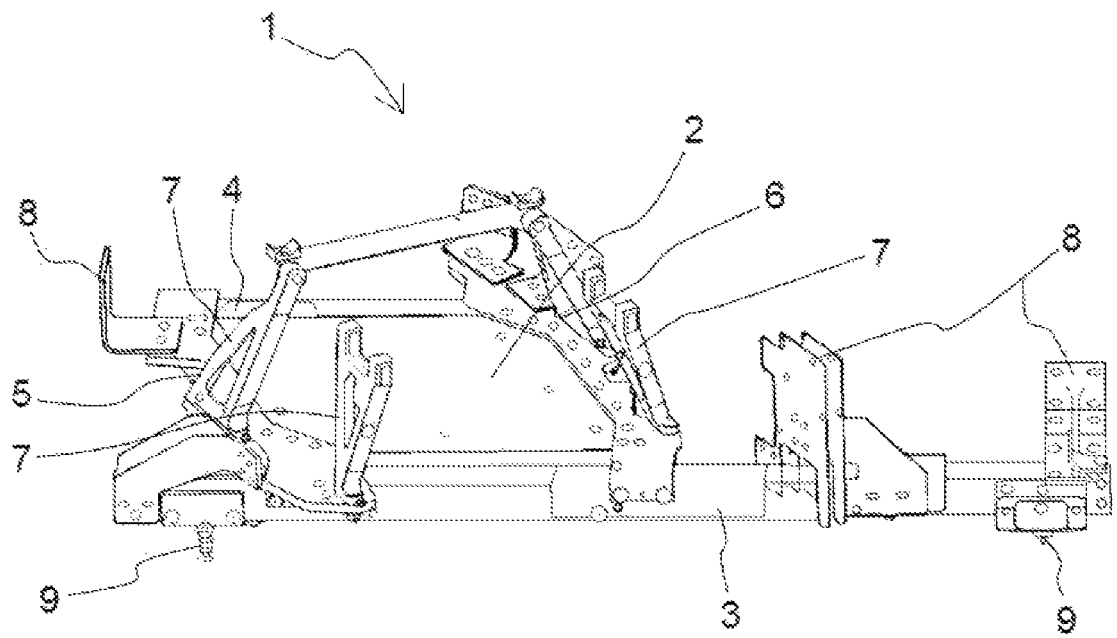
[Fig.2]
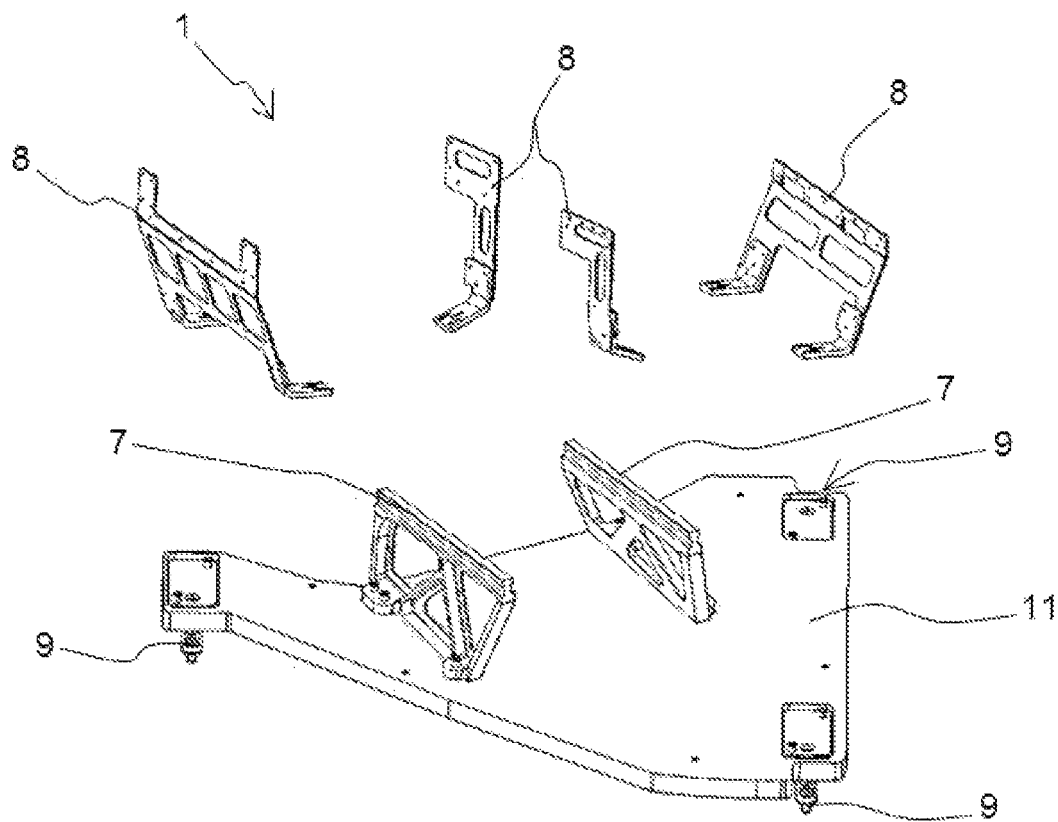

[Fig 3a]
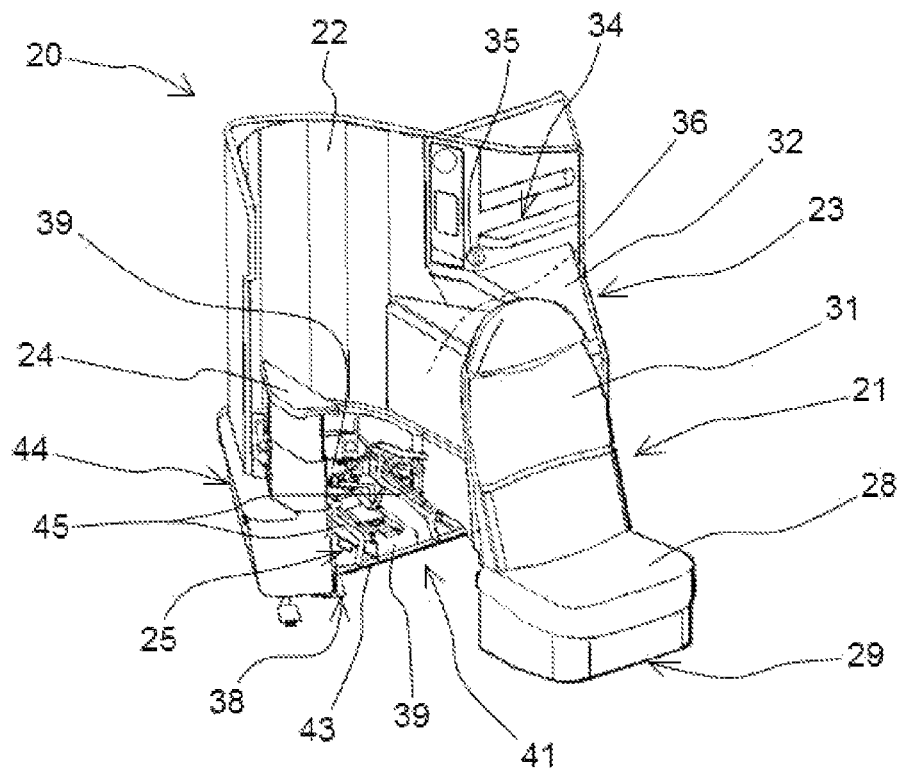
[Fig 3b]
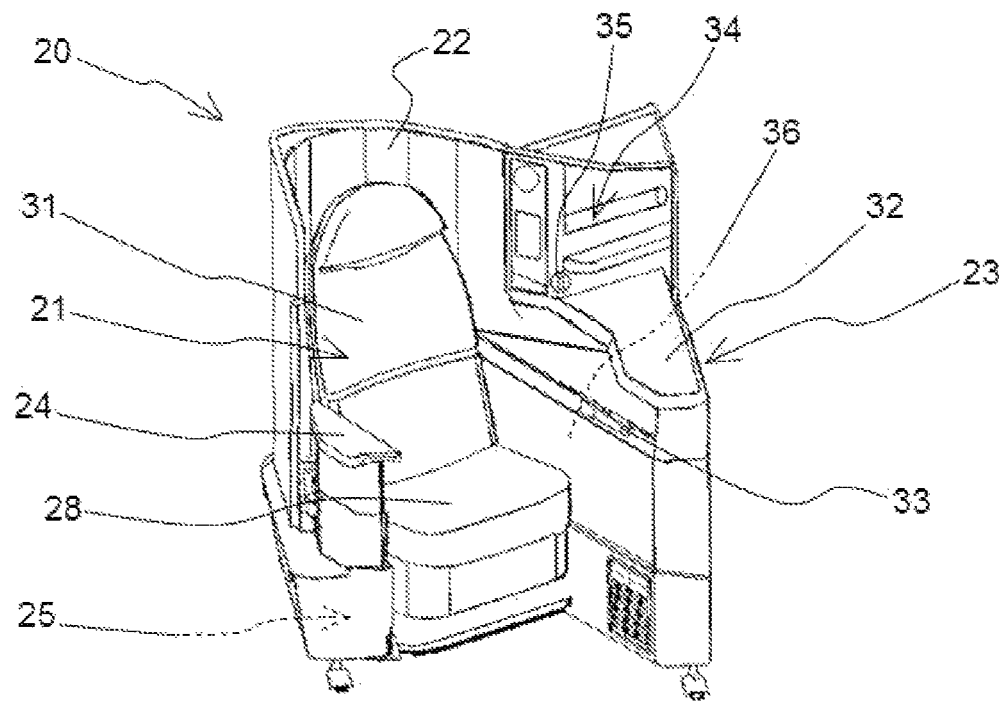

[Fig 4a]
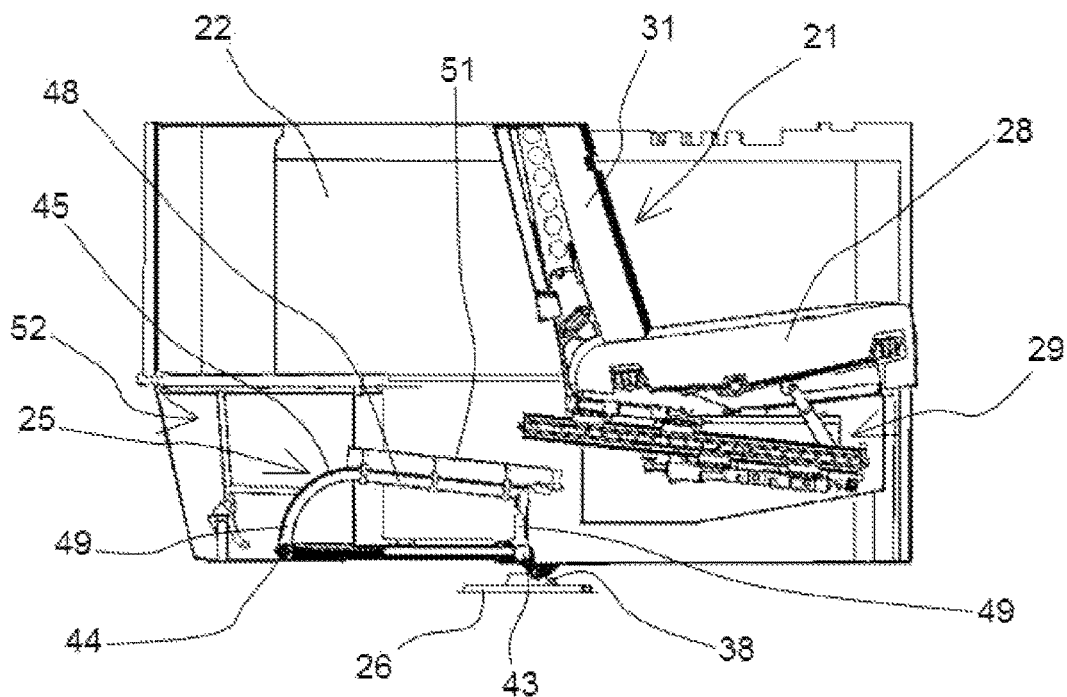
[Fig 4b]
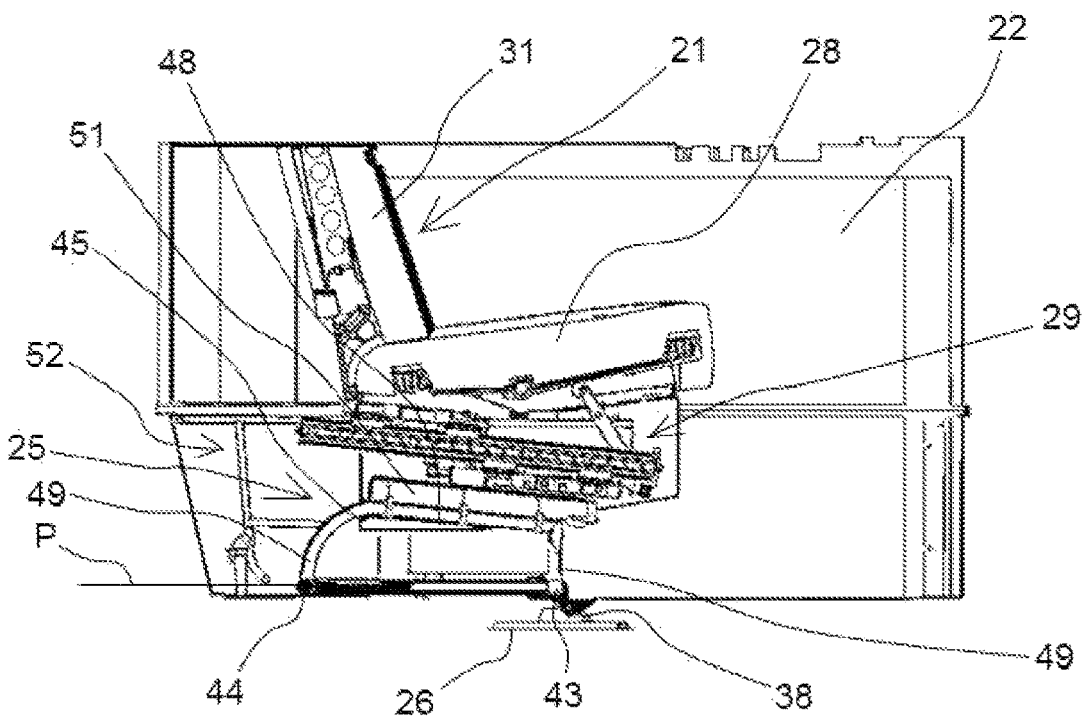

[Fig 5]
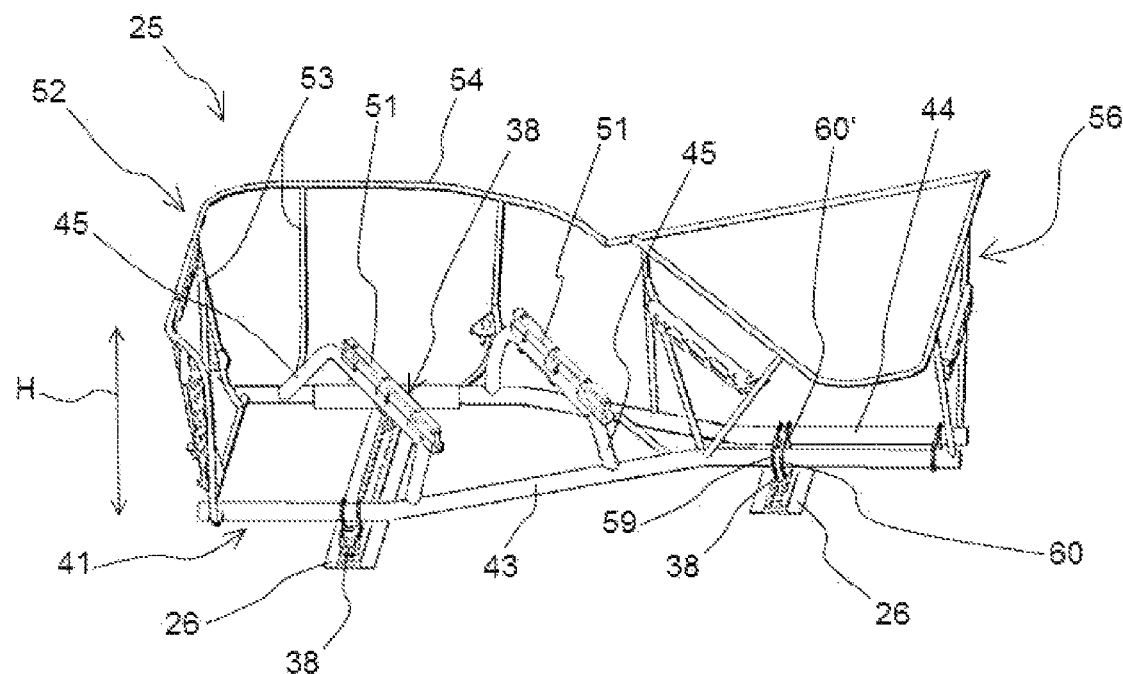
[Fig 6]
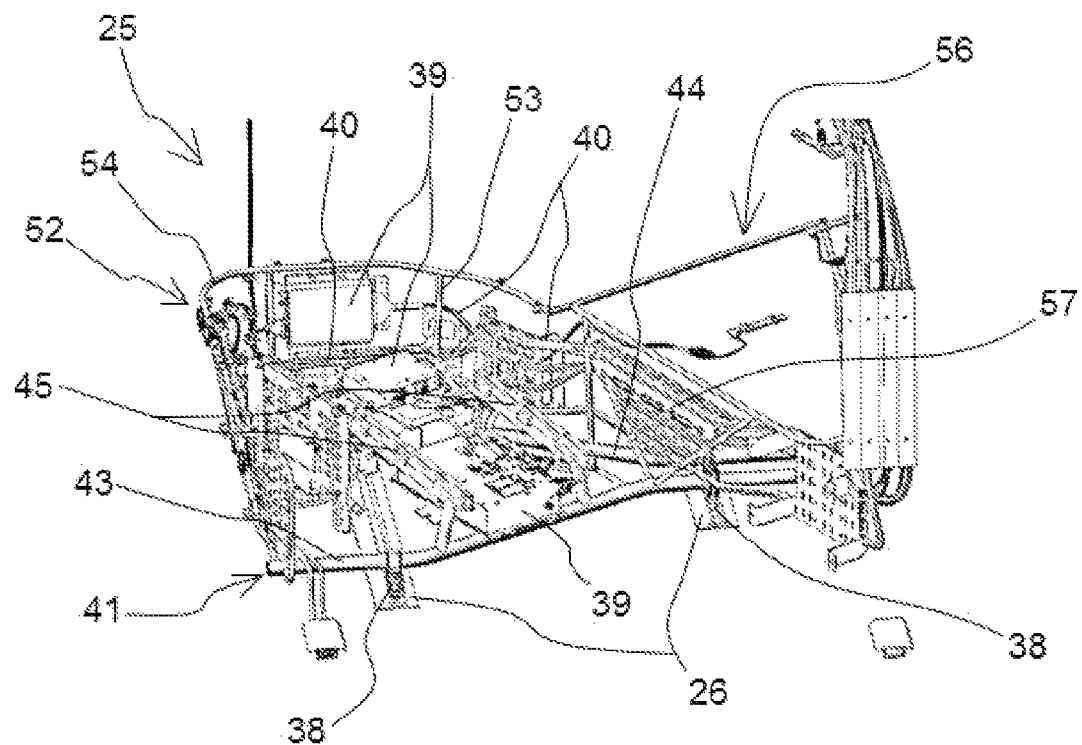

[Fig 7]
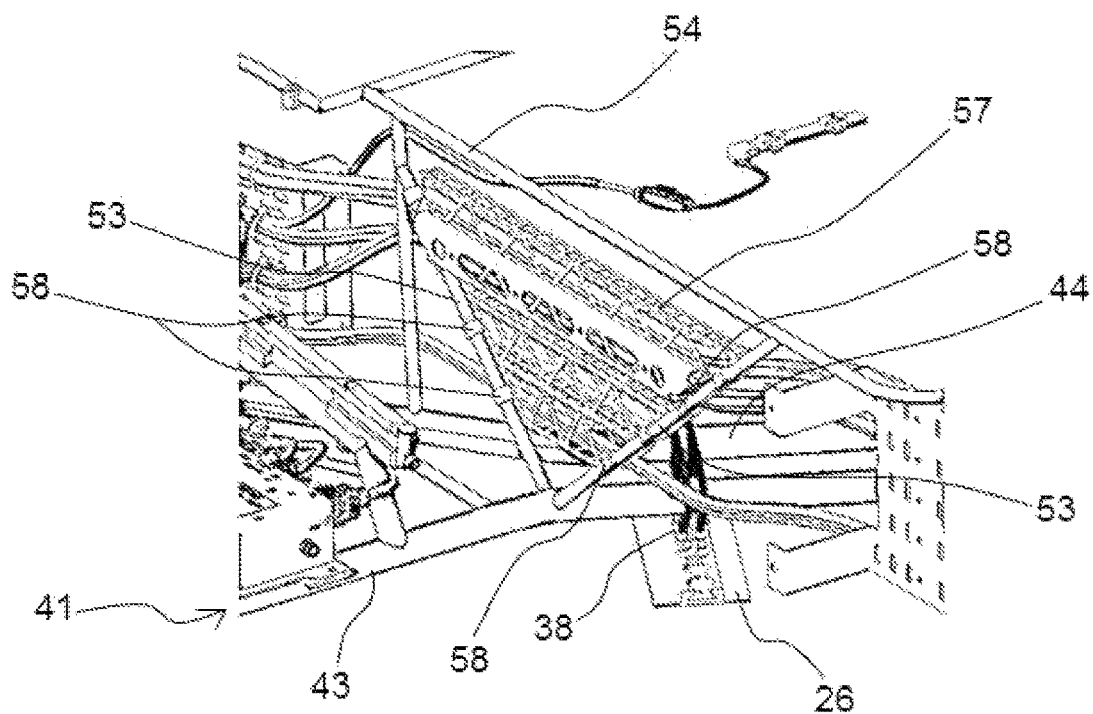
[Fig 8a]
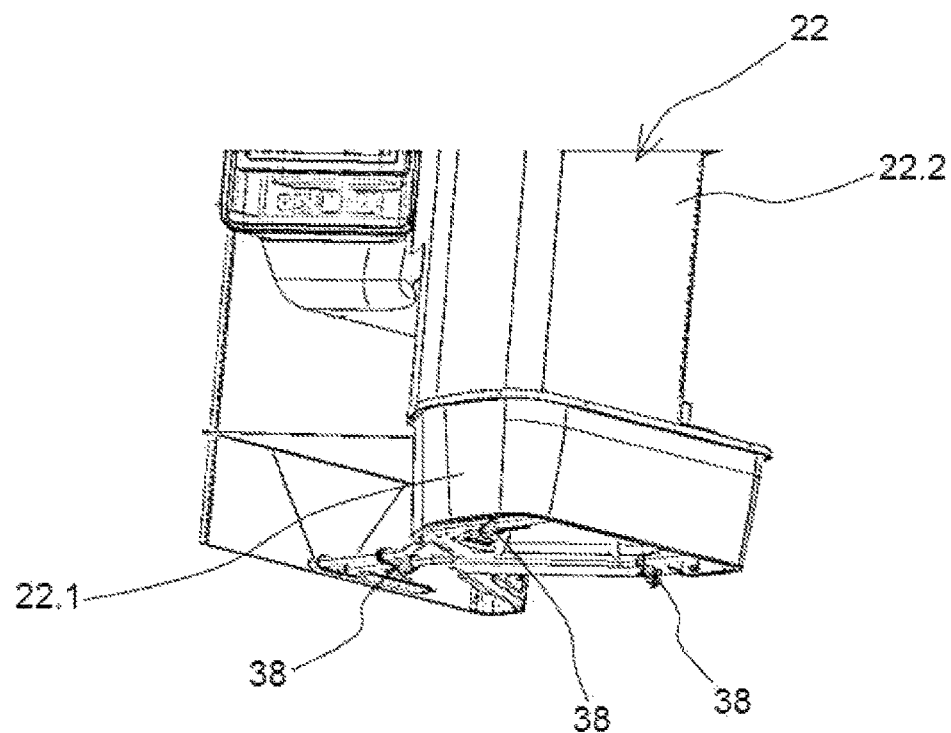

[Fig 8b]
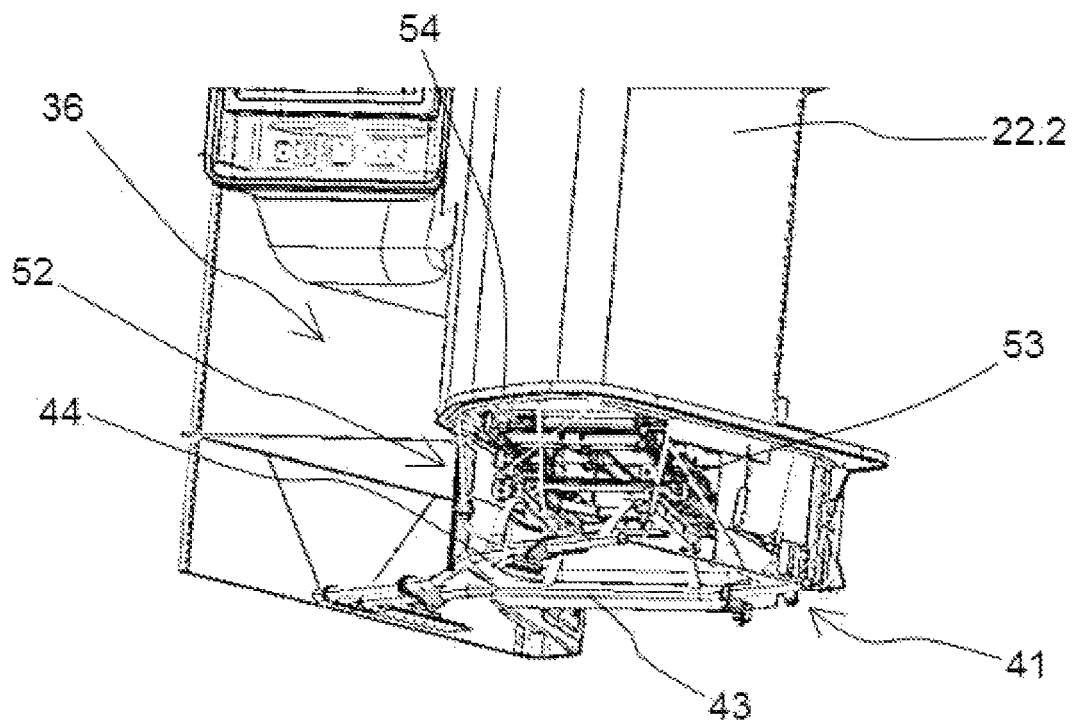
[Fig 9]
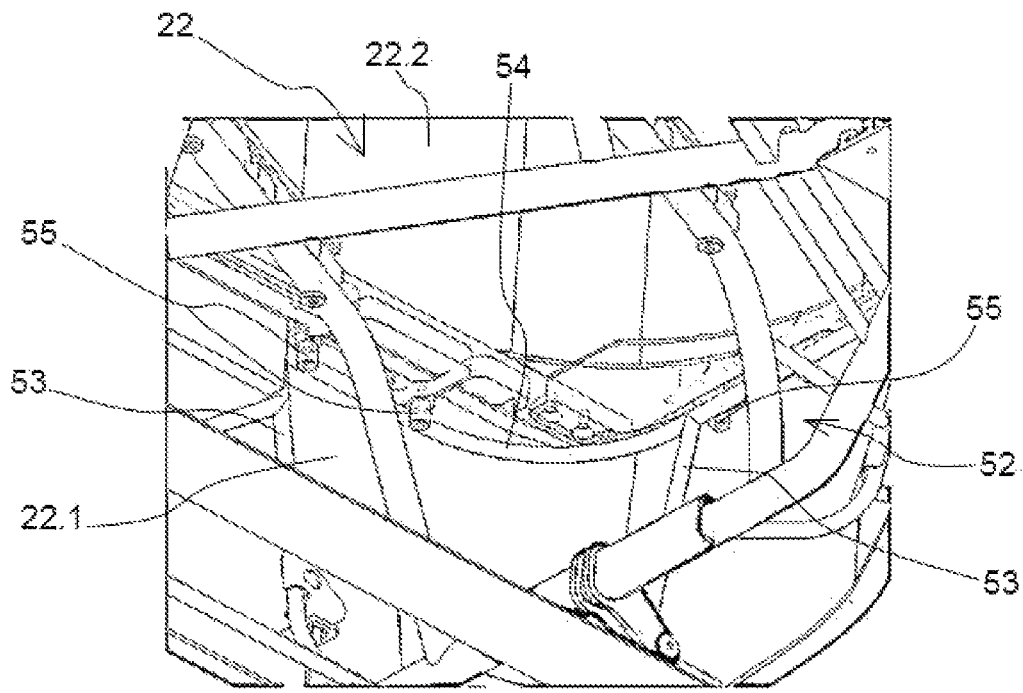

[Fig 10]
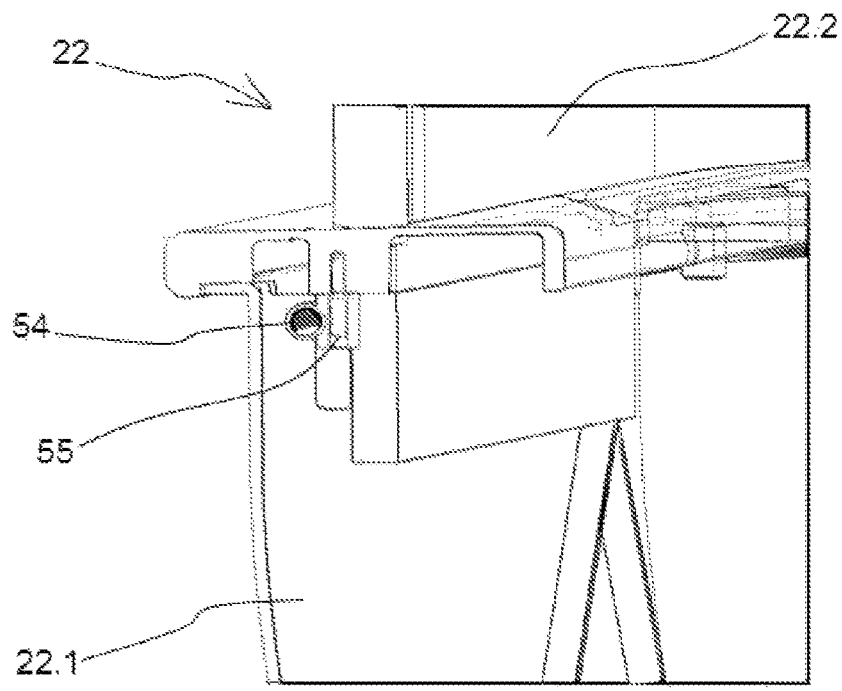
[Fig 11a]
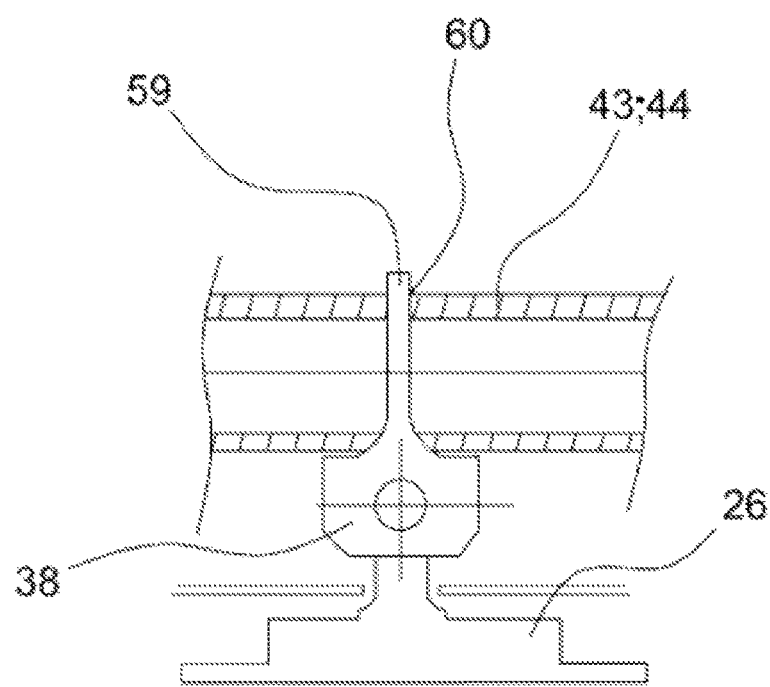

[Fig 11b]
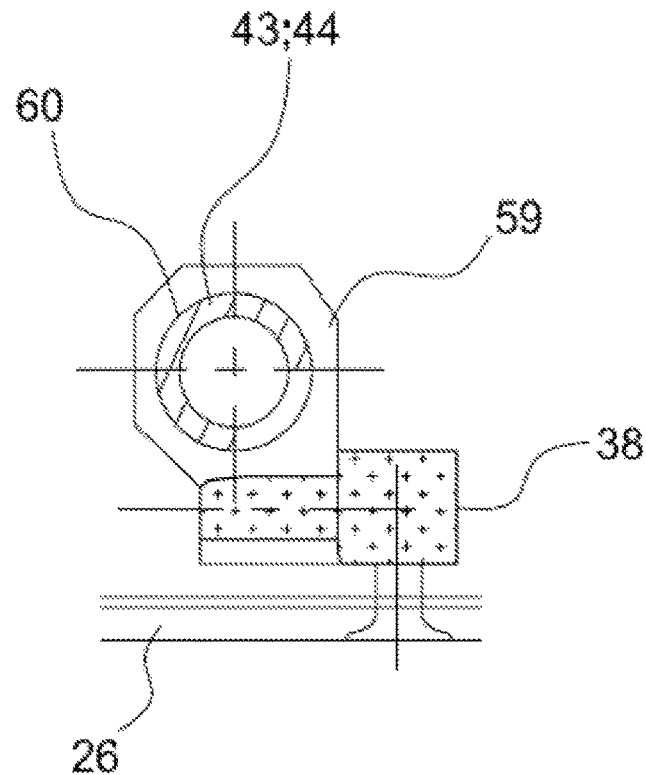
[Fig 12a]
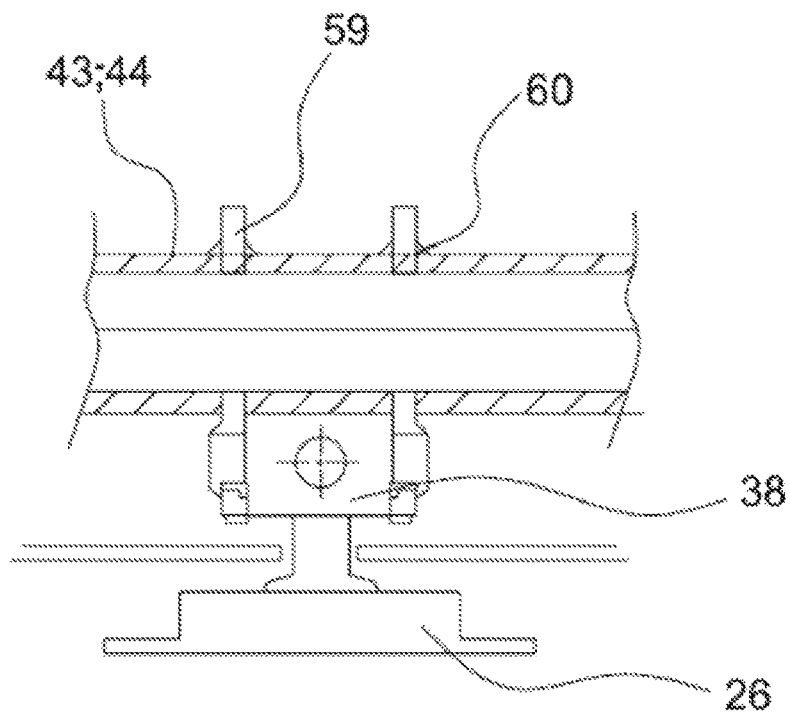

[Fig 12b]
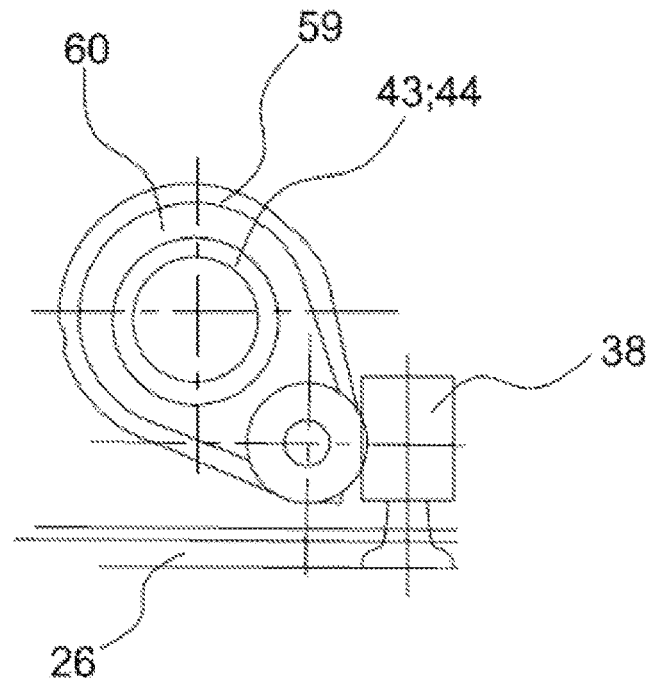
[Fig 13a]
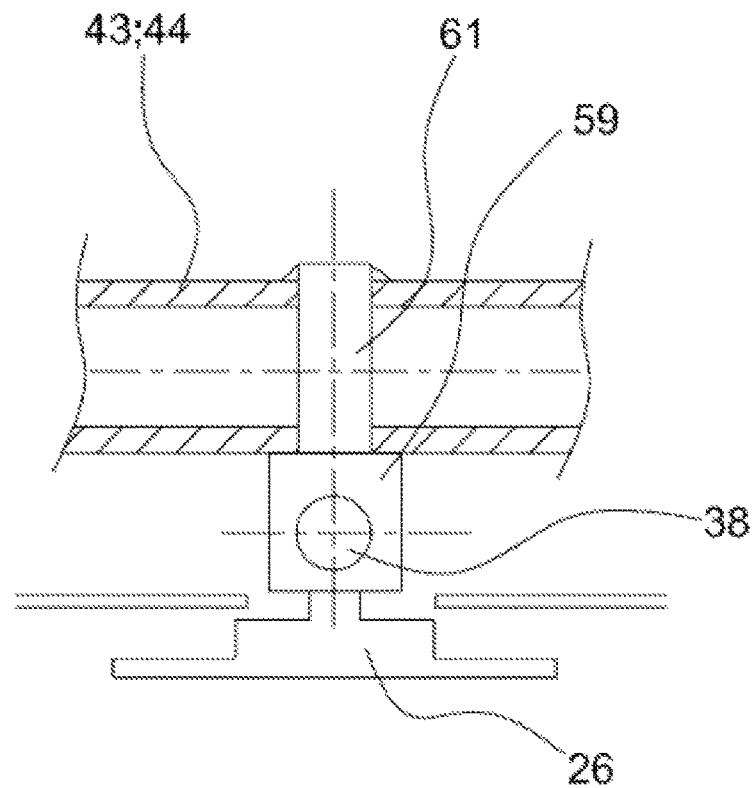

[Fig 13b]
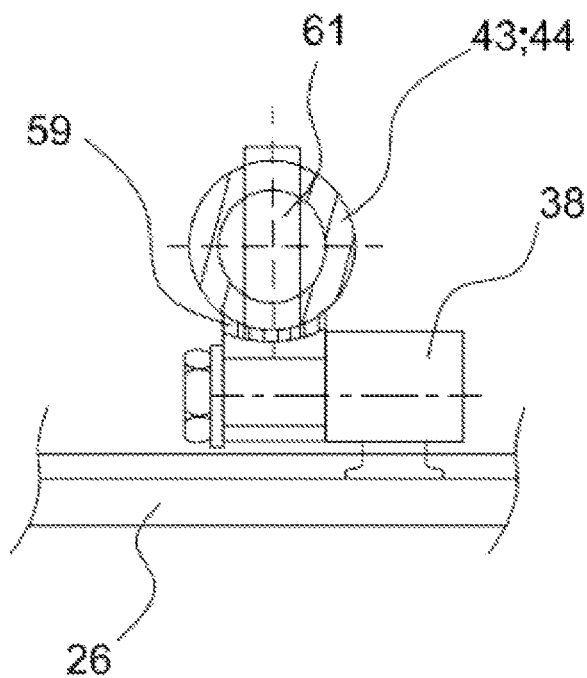
[Fig 14]
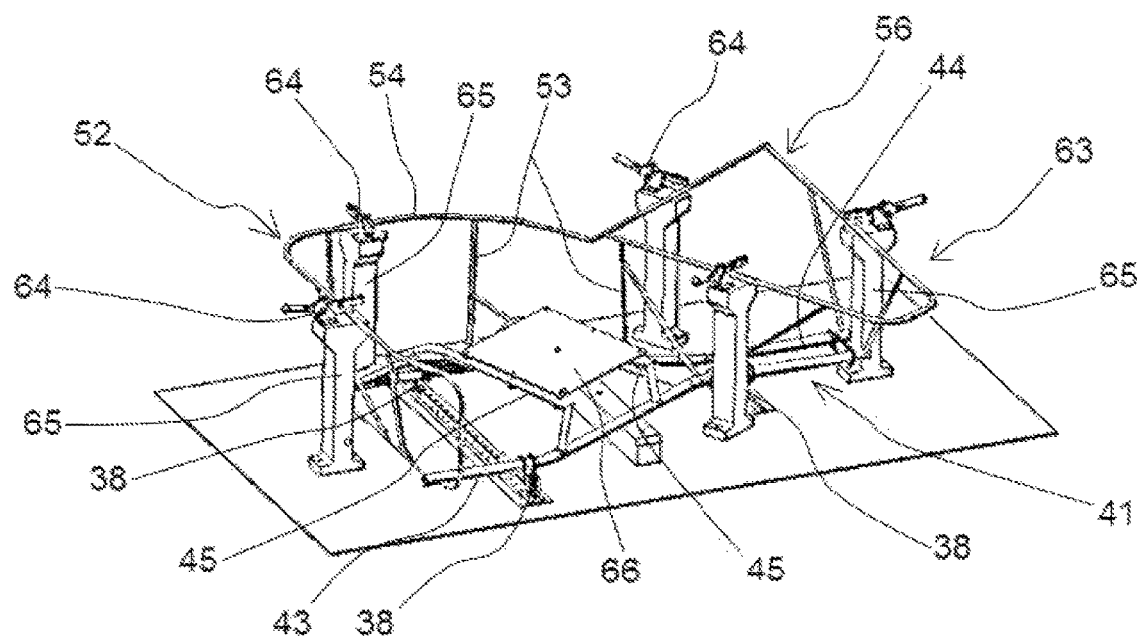

SEAT UNIT PROVIDED WITH A TUBULAR SEAT-BASE STRUCTURE

CROSS REFERENCE TO RELATED APPLICATIONS

This application is a national phase application of International Patent Application PCT/EP2021/068885 ("the '885 application"), filed on Jul. 7, 2021 and titled "SEAT UNIT PROVIDED WITH A TUBULAR SEAT-BASE STRUCTURE," which application is related to and claims priority benefits of France Patent Application No. 2007447 ("the '447 application"), filed on Jul. 16, 2020. The '885 and '447 applications are hereby incorporated in their entireties by this reference.

The present invention relates to a seat unit provided with a lower tubular-type seat structure. The invention finds a particularly advantageous, but not exclusive, application with aircraft seat units of the "business class" type. By "seat unit" it is meant the seat as such, as well as all the elements associated with the seat, such as a privacy shell, the lower seat structure and, where applicable, an armrest, a console, or other.

A lower seat unit structure is an interface part providing a mechanical connection between the rails of the aircraft and at least one element of the seat, such as a seating part and backrest kinematics.

As shown in FIG. 1, a lower seat structure 1 described in document EP18159172 comprises, in a manner known per se, a reinforcement panel 2 as well as a front cross member 3 and a rear cross member 4 located on either side other of the reinforcement panel 2. The cross members 3 and 4 generally consist of beams.

The mounting of this assembly is carried out by means of two spars 5, 6 each provided with a groove receiving an edge of the reinforcement panel 2. The beams 5, 6 are fixed to the panel 2 for example by means of rivets and the mounting of the spars 5, 6 on the beams 3, 4 is carried by means of screws.

The lower structure 1 further comprises legs 7 on its upper face for the fixation to a seating part and backrest kinematics as well as brackets 8 allowing the fixation of a privacy shell.

The lower structure 1 is also provided with locks 9 carried by the cross members 3, 4. The locks 9 ensure the mechanical connection between the lower seat structure 1 and the rails extending along the floor of the aircraft cabin. The mountings of the spars, the fasteners of the rails and the shells on the beams are made by means of screws.

Alternatively, as shown in FIG. 2, the lower seat structure 1 described in document FR1912243 comprises a machined plinth 11 provided on the underside with locks 9 providing a mechanical connection between the lower structure 1 and the rails of the aircraft cabin. The lower structure 1 further comprises legs 7 on its upper face for the fixing to a seating part and backrest kinematics as well as brackets 8 allowing the fixing of the privacy shell.

The lower seat structures can have multiple possible configurations linked in particular to the adaptation of the angle of the seats with respect to the axis of the cabin, to the particular platform of the aircraft, as well as to the specific requests of the airlines. This involves a wide variety of interface parts for mounting locks as well as fixing brackets.

This multiplication of interface parts generates a complex design, additional mass, as well as risks of mounting errors and significant mounting time.

Also, since tolerances are dependent on dimension figures for mechanical mountings, the tolerance of the mechanical mounting increases with the number of interface parts.

The mounting of a large number of parts also limits the space available for fixing electrical boxes to supplying, through a set of electrical harnesses, the various electrical components of the seat unit, such as seat actuators or video screens of an IFE-type entertainment system ((IFE=Inflight Entertainment).

Furthermore, in the context of compliance with new increasingly restrictive regulations, known lower structures are beginning to reach their limits in terms of resistance to mechanical forces in the event of impact.

The invention aims to effectively remedy the aforementioned drawbacks by proposing a seat unit, in particular for an aircraft cabin, comprising:
- a seat provided with a seating part and backrest kinematics, and
- a lower seat structure on which the seat is mounted,
- said lower seat structure comprising a tubular-structure frame comprising:
  - a first lower tube and a second lower tube, the first lower tube and the second lower tube each carrying at least one lock to be fixed on rails, and
  - two fixing legs for the seating part and backrest kinematics, a fixing leg being formed by a tube connected by one of its ends to the first lower tube of the frame and by its other end to the second lower tube of the frame.

The invention thus makes it possible, thanks to the tubular structure of the lower structure, to give the lower structure greater flexibility of design and greater modularity by allowing movement of the fasteners according to a position of the rails in the aircraft cabin without creating new interface parts.

The tubular design of the assembly also makes it possible to control the zone undergoing torsion in the event of a crash, which improves the behavior of the structure undergoing strong mechanical stress. Indeed, while maintaining good rigidity in the directions related to the crash, the tubular structure creates a flexibility allowing deformation of the structure according to that of the floor of the aircraft cabin.

The tubular structure, which can be made on a welding template, also makes it possible to better manage tolerances by eliminating the dispersion of play generated by screw mountings. The invention also allows mass savings compared to the known lower seat structures. The invention also makes it possible to clear a space under the seat, which facilitates the integration of the electrical boxes.

Furthermore, the invention makes it easier to dismount the frame during maintenance operations to access a defective electrical box located under the seat. It should also be noted that by integrating the fixing legs into the lower seat structure, the invention facilitates the installation of the seating part and backrest kinematics on the frame.

According to one embodiment of the invention, the fixing legs project with respect to a plane in which the first lower tube and the second lower tube of the frame extend.

According to one embodiment of the invention, a fixing guide is arranged on an upper portion of a corresponding fixing leg.

According to one embodiment of the invention, the first lower tube and the second lower tube are bent so that a gap between the first lower tube and the second lower tube is variable when moving from one end of the tubes to the other.

According to one embodiment, said seat unit further comprises a privacy shell.

According to one embodiment of the invention, the lower seat structure further comprises a reinforcing belt formed by a plurality of tubes, at least part of the privacy shell being fixed to said reinforcing belt.

According to one embodiment of the invention, the reinforcement belt is surrounded by a part of the privacy shell.

According to one embodiment of the invention, the reinforcement belt extends vertically over a height between 12 cm and 50 cm, and preferably of about 38 cm.

According to one embodiment of the invention, the privacy shell comprises a lower part and an upper part, so that it is possible to dismount only the lower part to access electrical boxes under the seat.

According to one embodiment of the invention, at least one passage trough for electrical harnesses is fixed to the reinforcement belt.

According to one embodiment of the invention, said seat unit comprises three locks so as to have a three-fixation-points configuration.

According to one embodiment of the invention, a lock is associated with a lock support.

According to one embodiment of the invention, the lock support comprises a single opening for the passage of a lower tube so as to allow movement of the lock support along the lower tube before immobilization by welding said lock support in a position corresponding to a positioning of a rail.

According to one embodiment of the invention, the lock support comprises two openings for the passage of the first lower tube and of the second lower tube respectively so as to allow movement of the lock support along the lower tubes before immobilization by welding said lock support in a position corresponding to a positioning of a rail.

According to one embodiment of the invention, the lock support is made of two parts.

The invention further relates to an airplane comprising a plurality of seat units as previously defined.

The invention will be better understood and other characteristics and advantages will appear by reading the following detailed description, which includes embodiments given for illustrative purposes with reference to the accompanying figures, presented as way of non-limiting examples, which may serve to complete the understanding of the present invention and the description of its implementation and eventually contribute to its definition, wherein:

FIG. 1, already described, is a perspective view of a first type of lower seat structure according to the state of the art;

FIG. 2, already described, is a perspective view of a second type of lower seat structure according to the state of the art;

FIG. 3a and FIG. 3b are perspective views of a seat unit according to the invention respectively before and after mounting a seat on the lower seat structure;

FIG. 4a and FIG. 4b are side views of a lower part of a seat unit according to the invention respectively before and after mounting a seat on the lower seat structure;

FIG. 5 is a perspective view of a lower seat structure according to the present invention;

FIG. 6 is a perspective view of a lower seat structure according to the present invention and electrical boxes associated with electrical harnesses to be connected to electrical components of the seat unit;

FIG. 7 is a perspective view of passage trough for electrical harnesses on a reinforcing belt of the lower seat structure according to the present invention;

FIG. 8a is a perspective view of a privacy shell in two parts in the assembled state;

FIG. 8b is a perspective view illustrating the possibility of dismounting a lower part of the privacy shell to access the electrical boxes under the seat;

FIG. 9 is a perspective view from below showing the attachment system for attaching the privacy shell to the lower seat structure;

FIG. 10 is a detailed perspective view of the attachment system for attaching the privacy shell to the lower seat structure;

FIGS. 11a and 11b are respectively longitudinal and transverse sectional views of a first embodiment of a lock support according to the invention and an associated lock;

FIGS. 12a and 12b are respectively longitudinal and transverse sectional views of a second embodiment of a lock support according to the invention and an associated lock;

FIGS. 13a and 13b are respectively longitudinal and transverse sectional views of a third embodiment of a lock support according to the invention and an associated lock;

FIG. 14 is a perspective view of a template used for manufacturing the lower seat structure according to the present invention.

It should be noted that, in FIG. 3a and following, the structural and/or functional elements common to the various embodiments may have the same references. Thus, unless otherwise stated, such elements have identical structural, dimensional and material properties.

FIGS. 3a and 3b show a seat unit 20, in particular for an airplane cabin, comprising a seat 21, a privacy shell 22 which extends around the seat 21 so as to isolate the passenger from the external environment, a console 23, an armrest 24, as well as a lower seat structure 25 for fixing the assembly to the rails 26 of the aircraft cabin.

More specifically, the seat 21 comprises a seating part 28 as well as a reclining backrest 31. The seat 21 is preferably a "business" type seat movable between a seat position and a bed position in which the various components of the seat 21 extend along a substantially horizontal plane. A seating part and backrest kinematics 29 visible in FIGS. 4a and 4b comprises mechanical components making it possible to ensure movement of the seating part 28 and the backrest 31, in particular to pass from the seat position to the bed position, and vice versa.

The console 23 has an upper face 32 on which the passenger can place objects, as shown in FIGS. 3a and 3b. The console 23 may incorporate a removable meal flap 33, storing equipments 34, as well as electrical outlets 35 for recharging electronic devices. The console 23 may also include an internal foot housing 36, clearly visible in FIG. 8b, for receiving the feet of a rear passenger when the seat 21 of said rear passenger is in the bed position.

The seating part and backrest kinematics 29, the privacy shell 22, and the console 23 are mounted on the lower seat structure 25, which is fixed to the rails 26 of the aircraft cabin by means of locks 38.

As can be seen in FIGS. 3a and 6, electrical boxes 39 are positioned under the seat 21. These electrical boxes 39 are provided for supplying, though a set of electrical harnesses 40, the various electrical components of the seat unit 20, such as seat actuators 21 or video screens of an IFE-type entertainment system (IFE=Inflight Entertainment).

Advantageously, as can be seen in FIGS. 5 and 6, the lower seat structure 25 comprises a frame 41 with a tubular structure. By "frame with a tubular structure" it is meant a frame 41 formed by a plurality of hollow tubes. Preferably, the tubular structure is a "mechanically welded" type structure, that is to say a structure formed by hollow metal tubes welded together. Advantageously, the metal tubes are made of steel. Alternatively, the tubes could however be made of another metallic material, such as aluminum or magnesium, or any other material suitable for the application. The tubes preferably have a round or oval section which is particularly well suited to withstand torsional forces associated with the deformation of the floor of the aircraft cabin during a crash. Alternatively, the tubes could however have a rectangular, square, trapezoidal, triangular section or any other shape suitable for the application.

The section may be constant over the length of the tubes or variable so as to locally reinforce the structure in areas subjected to particularly high mechanical stresses via welded or butted reinforcements or via deformation of the tube by a butted tubing process. Indeed, the tubular structure makes it possible to independently define the thickness of material with respect to the internal diameter of a tube in order to adapt the rigidity of the lower structure.

In this case, the frame 41 comprises a first lower tube 43 and a second lower tube 44. The first lower tube 43 and the second lower tube 44 each carry at least one lock 38 to be fixed on the rails 26 of the aircraft cabin.

The frame 41 further comprises two fixing legs 45 of the seating part and backrest kinematics 29. A fixing leg 45 is formed by a tube connected by one of its ends to the first lower tube 43 of the frame 41 and by its other end to the second lower tube 44 of the frame 41.

As can clearly be seen in FIGS. 4a and 4b, the fixing legs 45 project with respect to a plane P in which the first lower tube 43 and the second lower tube 44 of the frame 41 extend. A fixing leg 45 comprises an upper portion 48 and two connecting portions 49. One connecting portion 49 mechanically connects one end of the upper portion 48 to one corresponding lower tube 43, 44.

The seating part and backrest kinematics 29 are intended to be fixed on fixing guides 51. A fixing guide 51 is arranged on an upper portion 48 of a corresponding fixing leg 45 so as to be easily accessible for the operator. The fixing guides 51 also have an indexing function in order to facilitate the positioning of the seating part and backrest kinematics 29 during the mounting of the seat 21.

The first lower tube 43 and the second lower tube 44 are bent so that a gap between the first lower tube 43 and the second lower tube 44 is variable when moving from one end of the tubes 43, 44 to the other, as shown in FIGS. 5 and 6. In this case, the gap between the two lower tubes 43, 44 tends to decrease when moving from one end on the side of the fixing legs 45 towards the opposite end. Such a configuration makes it possible to optimize the floor space of the lower seat structure 25.

The lower seat structure 25 further comprises a reinforcement belt 52 formed by a plurality of tubes 53, 54. The plurality of tubes 53, 54 of the reinforcement belt 52 is mechanically connected to the lower tubes 43, 44. The reinforcement belt 52 is surrounded by a portion of the privacy shell 22. At least a portion of the privacy shell 22 is fixed to the reinforcement belt 52.

The reinforcement belt 52 makes it possible to effectively take up the forces applied to the privacy shell 22 in the event of an impact. This improves the mechanical strength of the privacy shell 22 during a crash. In addition, due to a separate fixation of the shell 22 and the seat 21 to the lower seat structure 25, such a configuration makes it possible to distribute and divide the paths of forces applied to the seat unit 20 during a crash.

More specifically, in the example shown, the reinforcement belt 52 comprises upright tubes 53 and a connecting tube 54 connecting the upright tubes 53 to each other. For this purpose, the upright tubes 53 are connected by one end to one of the lower tubes 43, 44 and by another end to the connecting tube 54. The connecting tube 54 extends in a substantially horizontal plane. Additional reinforcing tubes may be used to connect two adjacent upright tubes 53 together. Another configuration of the tubes 53, 54 is of course possible.

Advantageously, the reinforcement belt 52 extends vertically over a height comprised between 12 cm and 50 cm, and preferably of about 38 cm. By "about" it is meant a variation of plus or minus 10% around the target value.

As illustrated by FIGS. 8a and 8b, the privacy shell 22 is preferably made of two parts. Thus, the privacy shell 22 comprises a lower part 22.1 and an upper part 22.2, so that it is possible to dismount only the lower part 22.1 to access the electrical boxes 39 under the seat 21.

As can be seen in FIGS. 9 and 10, the fixation of the privacy shell 22 on the reinforcement belt 52 can be carried out by means of sleeves 55 fixed to the connecting tube 54. A fixing member, such as a screw, is inserted inside a sleeve 55 so as to cooperate with a thread in an interface part of the shell 22. Alternatively, the screws may be replaced with rivets, studs, or any other fastener suitable for the application.

The reinforcement belt 52 may be extended by a tubular portion 56 to which the console 23 is fixed. In this case the tubular portion 56 has a triangular shape corresponding to the shape of the console 23.

Preferably, at least one passage trough 57 for electrical harnesses 40 is fixed to the reinforcing belt 52, as shown in FIGS. 6 and 7. To this end, the passage trough 57 preferably comprises removable fixation means 58 allowing the operator to easily fix the passage trough 57 on the tubes 53, 54 of the reinforcement belt 52. The removable fixation means 58 may for example consist of elastically deformable snap-fastening devices, for example C-shaped ones.

The electrical harnesses 40 from the electrical boxes 39 and to be connected to the various electrical components of the seat 21 can thus be arranged inside the passage trough 57 in order to facilitate their installation in the lower part of the seat 21.

The seat unit 20 preferably includes three locks 38 so as to have a three-fixation-points configuration. Alternatively, the seat unit 20 could however have more than three locks 38.

As can be seen in FIGS. 11a, 11b, 12a, 12b, 13a, and 13b, a lock 38 is associated with a lock support 59. The lock 38 is mounted so as to rotate about a horizontal axis relative to the lock support 59 to facilitate, due to a degree of freedom in rotation, its positioning on a corresponding rail 26. In this case, the pivoting axis of the lock 38 extends in a longitudinal direction with respect to the longitudinal axis of the aircraft.

The lock support 59 may comprise a single opening 60 for the passage of a lower tube 43, 44 so as to allow movement of the lock support 59 along the lower tube 43, 44 before immobilization by welding said lock support 59 in a position corresponding to a positioning of a rail 26.

Alternatively, the lock support 59 on the right in FIG. 5 comprises two openings 60, 60' for the passage of the first lower tube 43 and the second lower tube 44 respectively so as to allow movement of the lock support 59 along the lower tubes 43, 44 before immobilization by welding said lock support 59 in a position corresponding to a positioning of a rail 26. In this case, the pivoting axis of the lock 38 extends in a direction transversal to the longitudinal axis of the aircraft.

In the embodiment in FIGS. 12a and 12b, the lock support 59 is made of two parts.

In the embodiment of FIGS. 13a and 13b, the lock support 59 is fixed to a corresponding lower tube 43, 44 by means of a pin 61 through a corresponding lower tube 43, 44.

A template 63 shown in FIG. 14 is used to carry out the lower seat structure 25 according to the invention. The different tubes 43, 44, 53, 54 of the frame 41 and the reinforcement belt 52 are maintained in position with the help of clamps 64 carried by columns 65 of the template 63. The lock supports 38 are moved along lower tubes 43, 44 so as to cooperate with the corresponding rails 26 at locations corresponding to a particular cabin configuration. A plate 66 makes it possible to define the gap between the fixing legs 45 of the seat 21.

Once all the elements of the lower seat structure 25 are in a desired position, an operator or a robot can ensure the welding of the tubes 43, 44, 53, 54 one to another as well as the welding of the lock supports 38 on the lower tubes 43, 44. The lower seat structure 25 is thus obtained. The template 63 thus allows a great modularity of the lower seat structure 25 which is thus easily adaptable to the configuration of the aircraft cabin, the seat 21, the console 23, and the positioning of the rails 26.

When mounting the seat unit 20 inside the aircraft cabin, the lower seat structure 25 associated with the privacy shell 22 and the console 23 is first mounted on the rails 26 via lock 38, as shown in FIGS. 3a and 4a.

Then, as shown in FIGS. 3b and 4b, the seating part and backrest kinematics 29 is put in place on the fixing guides 51 which ensure the position indexing of the seating part and backrest kinematics 29. Once the seating part and backrest kinematics 29 are in a correct position with respect to the privacy shell 22, the seating part and backrest kinematics 29 are fixed to the fixing guides 51 with the help of suitable fixation means, such as screws or rivets.

In the example shown, the seat 21 has an axis forming a non-zero angle with respect to a longitudinal axis of the aircraft. Alternatively, the axis of the seat 21 may extend parallel to the longitudinal axis of the aircraft.

Alternatively, the seat 21 may have several places. Alternatively, several seats 21 can be installed on the same lower seat structure 25.

The invention also relates to an airplane comprising a plurality of seat units 20 as previously defined.

Of course, the different features, variants and/or embodiments of the present invention can be associated with each other in various combinations insofar as they are not incompatible with one another or exclusive of each other. Furthermore, the invention is not limited to the embodiments described above and provided solely by way of example. It encompasses various modifications, alternative forms and other variants that a person skilled in the art may envisage in the context of the present invention and in particular any combination of the various operating modes of operation described previously, which may be taken separately or in combination.

The invention claimed is:

1. A seat unit for an aircraft cabin, comprising:
   a seat provided with a seating part and backrest kinematics, and
   a lower seat structure on which the seat is mounted, wherein said lower seat structure comprises a frame with a tubular structure comprising:
   a first lower tube and a second lower tube, the first lower tube and the second lower tube each carrying at least one lock to be fixed on rails, and
   two fixing legs of the seating part and backrest kinematics, one fixing leg being formed by a tube connected by a first end to the first lower tube of the frame and by a second end to the second lower tube of the frame,
   wherein the seat unit further comprises a privacy shell,
   wherein the lower seat structure further comprises a reinforcing belt formed by a plurality of tubes, at least a part of the privacy shell being fixed to said reinforcement belt,
   wherein the plurality of tubes of the reinforcement belt are mechanically connected to the first and second lower tubes.

2. The seat unit according to claim 1, wherein the fixing legs project with respect to a plane in which the first lower tube and the second lower tube of the frame extend.

3. The seat unit according to claim 1, wherein a fixing guide is arranged on an upper portion of one of the two fixing legs.

4. The seat unit according to claim 1, wherein the first lower tube and the second lower tube are bent so that a gap between the first lower tube and the second lower tube is variable when moving between ends of the first and second lower tubes.

5. The seat unit according to claim 1, wherein the reinforcement belt is surrounded by a portion of the privacy shell.

6. The seat unit according to claim 1, wherein the reinforcement belt extends vertically over a height between 12 cm and 50 cm.

7. The seat unit according to claim 1, wherein the privacy shell has a lower part and an upper part, wherein the lower part is dismountable from the upper part to provide access to an electrical box under the seat.

8. The seat unit according to claim 1, wherein at least one passage trough for an electrical harnesses is fixed to the reinforcing belt.

9. The seat unit according to claim 1, wherein the seat unit comprises three locks so as to have a three-fixation-points configuration.

10. The seat unit according to claim 1, wherein the lock is associated with a lock support.

11. The seat unit according to claim 10, wherein the lock support comprises a single opening for a passage of the first lower tube or the second lower tube so as to allow movement of the lock support along the first lower tube or the second lower tube before immobilization by welding said lock support in a position corresponding to a positioning of a rail.

12. The seat unit according to claim 10, wherein the lock support comprises two openings for the passage of the first lower tube and the second lower tube respectively so as to allow movement of the lock support along the first and second lower tubes before immobilization by welding said lock support in a position corresponding to a positioning of a rail.

13. The seat unit according to claim 10, wherein the lock support comprises two parts.

14. An aircraft comprising a plurality of seat units as defined in claim 1.

* * * * *